United States Patent
Nomura et al.

(10) Patent No.: US 11,416,705 B2
(45) Date of Patent: Aug. 16, 2022

(54) MODEL LEARNING DEVICE, METHOD FOR LEARNED MODEL GENERATION, PROGRAM, LEARNED MODEL, MONITORING DEVICE, AND MONITORING METHOD

(71) Applicant: Mitsubishi Hitachi Power Systems, Ltd., Kanagawa (JP)

(72) Inventors: Masumi Nomura, Tokyo (JP); Koki Tateishi, Tokyo (JP); Motoshi Takasu, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 21 days.

(21) Appl. No.: 16/631,742

(22) PCT Filed: Jul. 13, 2018

(86) PCT No.: PCT/JP2018/026457
§ 371 (c)(1),
(2) Date: Jan. 16, 2020

(87) PCT Pub. No.: WO2019/021855
PCT Pub. Date: Jan. 31, 2019

(65) Prior Publication Data
US 2020/0184265 A1    Jun. 11, 2020

(30) Foreign Application Priority Data

Jul. 27, 2017   (JP) .............................. JP2017-145268

(51) Int. Cl.
*G06K 9/62* (2022.01)
*G06T 7/11* (2017.01)
*G06T 7/90* (2017.01)

(52) U.S. Cl.
CPC .............. *G06K 9/6256* (2013.01); *G06T 7/11* (2017.01); *G06T 7/90* (2017.01); *G06T 2207/10048* (2013.01)

(58) Field of Classification Search
CPC ........ G06K 9/6256; G06K 9/627; G06T 7/00; G06T 7/11; G06T 7/90;
(Continued)

(56) References Cited

U.S. PATENT DOCUMENTS

2006/0284895 A1* 12/2006 Marcu ...................... G09G 5/10
345/690
2013/0142420 A1*  6/2013 Tsuboshita ......... G06K 9/00664
382/159

(Continued)

FOREIGN PATENT DOCUMENTS

| JP | 07-078239 | 3/1995 |
|----|-----------|--------|
| JP | 2008-287378 | 11/2008 |

(Continued)

OTHER PUBLICATIONS

Ullan I, Yang F, Knan R, Liu L, Yang H, Gao B, Sun K. Predictive Maintenance or Power Substaton Equipment by Infrared Thermography Using a Machine-Learning Approach. Energies. 2017; 10(12):1987. https://doi.org/10.3390/en10121987 (Year: 2017).*

(Continued)

*Primary Examiner* — Leon Viet Q Nguyen
(74) *Attorney, Agent, or Firm* — Wenderoth, Lind & Ponack, L.L.P.

(57) ABSTRACT

An image acquisition unit acquires image data in which an image of a normal monitoring target is captured. An image processing unit generates a plurality of duplicate image data pieces by performing different image processing causing a change in color tone on the image data within a range not exceeding a normal range of the monitoring target. A (Continued)

learning unit trains a model so as to output a value used for determining normality of the monitoring target from the image data, in which the image of the monitoring target is captured, using the plurality of duplicate image data pieces as training data.

11 Claims, 7 Drawing Sheets

(58) Field of Classification Search
CPC . G06T 2207/10016; G06T 2207/10048; G06T 2207/20081; G06T 2207/20084; G06T 2207/30232
See application file for complete search history.

(56) References Cited

U.S. PATENT DOCUMENTS

| | | | | |
|---|---|---|---|---|
| 2014/0300772 | A1* | 10/2014 | Kaifu | G03B 9/02 348/223.1 |
| 2017/0243043 | A1* | 8/2017 | Andersson | G06V 40/1359 |
| 2019/0385325 | A1* | 12/2019 | Kweon | G06T 7/593 |
| 2020/0018707 | A1* | 1/2020 | Hanabusa | G01N 21/8803 |

FOREIGN PATENT DOCUMENTS

| | | |
|---|---|---|
| JP | 2012-209831 | 10/2012 |
| JP | 2016-062524 | 4/2016 |

OTHER PUBLICATIONS

Adam Glowacz, Zygfryd Glowacz,Diagnosis of the three-phase inauction motor using thermal imaging,Infrared Physics & Technology,vol.81,2017,pp. 7-16,ISSN 1350-4495,https://doi.org/10.106/j.infrared.2016.12.003 (Year: 2017).*
Adam Glowacz, Zygfryd Glowacz, Diagnostics of stator faults of the single-phase induction motor using thermal images, MoASoS and selected classifiers, Measurement, vol. 93,2016,pp. 86-93,ISSN 0263-2241 ,https://doi.org/10.1016/j.measurement.2016.07.008. (Year: 2016).*
Adam Glowacz, Zygfryd Glowacz, Diagnostics of stator faults of the single-phase induction motor using thermal images, MoASoS and selected classifiers, Measurement, vol. 93,2016,pp. 86-93, ISSN 0263-2241 ,httos://doi.org/10.1016/j.measurement.2016.07.008. (Year: 2016).*
Howard, Andrew G. "Some Improvements on Deep Convolutional Neural Network Based Image Classification." ArXiv:1312.5402 [Cs], Dec. 2013. arXiv.org, http://arxiv.org/abs/1312.5402 (Year: 2013).*
International Search Report dated Oct. 2, 2018 in corresponding International Application No. PCT/JP2018/026457 (with English translation).
Written Opinion of the International Searching Authority dated Oct. 2, 2018 in corresponding International Patent Application No. PCT/JP2018/026457 (with English translation).
Osabe, Dai et al., "Solutions to social problems leveraging image analysis technology based on machine learning", Fujitsu, Nov. 1, 2016, vol. 67, No. 6, pp. 29-35 (with English abstract and cited in the International Search Report and the Written Opinion of corresponding International Application No. PCT/JP2018/026457).

* cited by examiner

MODEL LEARNING DEVICE, METHOD FOR LEARNED MODEL GENERATION, PROGRAM, LEARNED MODEL, MONITORING DEVICE, AND MONITORING METHOD

TECHNICAL FIELD

The present invention relates to a model learning device, a method for learned model generation, a program, a learned model, a monitoring device, and a monitoring method.

Priority is claimed on Japanese Patent Application No. 2017-145268, filed on Jul. 27, 2017, the content of which is incorporated herein by reference.

BACKGROUND ART

PTL 1 discloses a technique of generating a normal standard image by learning in advance a normal-state image of a monitoring target in a past and determining normality of a monitoring target by comparing an image, which is captured by imaging the monitoring target, with the normal standard image.

PTL 2 discloses a technique for increasing training data while saving the effort of labeling by performing filter processing, trimming processing, and rotation processing on an image as training data in a case of training a model relating to machine learning.

CITATION LIST

Patent Literature

[PTL 1] Japanese Unexamined Patent Application, First Publication No. H7-78239
[PTL 2] Japanese Unexamined Patent Application, First Publication No. 2016-62524

DISCLOSURE OF INVENTION

Technical Problem

In the invention described in PTL 1, in order to generate the normal standard image, it is necessary to provide a large number of images of the monitoring target in the normal state. On the other hand, there is a demand for quick determination of the normality of the monitoring target. In such a case, it may not be possible to provide a sufficient image for learning.

An object of the present invention is to provide a model learning device, a learned model generation method, a program, a learned model, a monitoring device, and a monitoring method capable of appropriately determining normality of the monitoring target by using a learned model even in a state where the volume of the training data is small.

Solution to Problem

According to a first aspect of the present invention, a model learning device includes: an image acquisition unit that acquires image data in which an image of a normal monitoring target is captured; an image processing unit that generates a plurality of duplicate image data pieces by performing different image processing causing a change in color tone on the image data within a range not exceeding a normal range of the monitoring target; and a learning unit that trains a model so as to output a value used for determining normality of the monitoring target from the image data, in which the image of the monitoring target is captured, using the plurality of duplicate image data pieces as training data.

According to a second aspect of the present invention, in the model learning device of the first aspect, the image data may include a thermal image having a different color tone depending on a temperature of the monitoring target. In addition, the image processing unit may generate the plurality of duplicate image data pieces by performing image processing for correcting the color tone of the image data to a color tone corresponding to a different temperature within a change range of an environmental temperature of the monitoring target.

According to a third aspect of the present invention, the model learning device of the second aspect may further include a temperature acquisition unit that acquires temperature data indicating the environmental temperature of the monitoring target of when the image data is captured; and a correction value specification unit that specifies a relationship between a temperature change and a color tone correction value on the basis of the image data and the temperature data. The image processing unit may perform image processing on the image data using the correction value specified on the basis of the relationship specified by the correction value specification unit.

According to a fourth aspect of the present invention, in the model learning device according to any one of the first to third aspects, the image processing unit may generate the plurality of duplicate image data pieces by performing image processing for correcting the color tone of the image data to a color tone corresponding to a different illuminance within a change range of an environmental illuminance of the monitoring target.

According to a fifth aspect of the present invention, the model learning device according to any one of the first to fourth aspects may further include a partitioning unit that generates a plurality of partitioned image data pieces by partitioning the image data. The image processing unit may generate the plurality of duplicate image data pieces by performing different image processing causing a change in color tone on each of the plurality of partitioned image data pieces.

According to a sixth aspect of the present invention, the method for learned model generation includes a step of acquiring image data in which an image of a normal monitoring target is captured; a step of generating a plurality of duplicate image data pieces by performing different image processing causing a change in color tone on the image data within a range not exceeding a normal range of the monitoring target; and a step of generating a learned model by training a model so as to output a value used for determining normality of the monitoring target from the image data, in which the image of the monitoring target is captured, using the plurality of duplicate image data pieces as training data.

According to a seventh aspect of the present invention, a program causes a computer to execute: a step of acquiring image data in which an image of a normal monitoring target is captured; a step of generating a plurality of duplicate image data pieces by performing different image processing causing a change in color tone on the image data within a range not exceeding a normal range of the monitoring target; and a step of training a model so as to output a value used for determining normality of the monitoring target from the image data, in which the image of the monitoring target is captured, using the plurality of duplicate image data pieces as training data.

According to an eighth aspect of the present invention, a learned model is a model which is trained so as to output a value used for determining normality of a monitoring target from image data, in which an image of the monitoring target is captured, using a plurality of duplicate image data pieces, which are generated by performing different image processing causing a change in color tone on the image data in which the image of the monitoring target is captured in a normal state without exceeding a normal range of the monitoring target, as training data. The learned model causes a computer to execute a step of outputting a value used for determining normality of the monitoring target from the acquired image data.

According to a ninth aspect of the present invention, a monitoring device includes: an image acquisition unit that acquires captured image data; an inference processing unit that calculates a value used in determining normality of a monitoring target from the image data using the learned model according to the eighth aspect; and a determination unit that determines normality of the monitoring target by using the calculated value.

According to a tenth aspect of the present invention, a monitoring method includes: a step of acquiring image data in which an image of a monitoring target is captured; a step of calculating a value used in determining normality of a monitoring target from the image data using the learned model which is trained by the model learning device according to the ninth aspect; and a step of determining normality of the monitoring target by using the calculated value.

Advantageous Effects of Invention

According to at least one of the above aspects, the model learning device is able to appropriately determine the normality of the monitoring target on the basis of the learned model even in a state where the volume of the training data is small.

BEST MODE FOR CARRYING OUT THE INVENTION

Definition

The term "specify" means determining a second value at which a plurality of values can be taken using a first value. For example, the term "specify" is defined to include calculating the second value from the first value, reading the second value corresponding to the first value with reference to a table, searching for the second value by using the first value as a query, and selecting the second value from a plurality of candidates on the basis of the first value.

The term "acquire" means obtaining a new value. For example, the term "acquire" is defined to include receiving a value, receiving an input of a value, reading a value from a table, calculating a value, and measuring a value.

First Embodiment

Hereinafter, embodiments will be described in detail with reference to the drawings.

Figure 1:
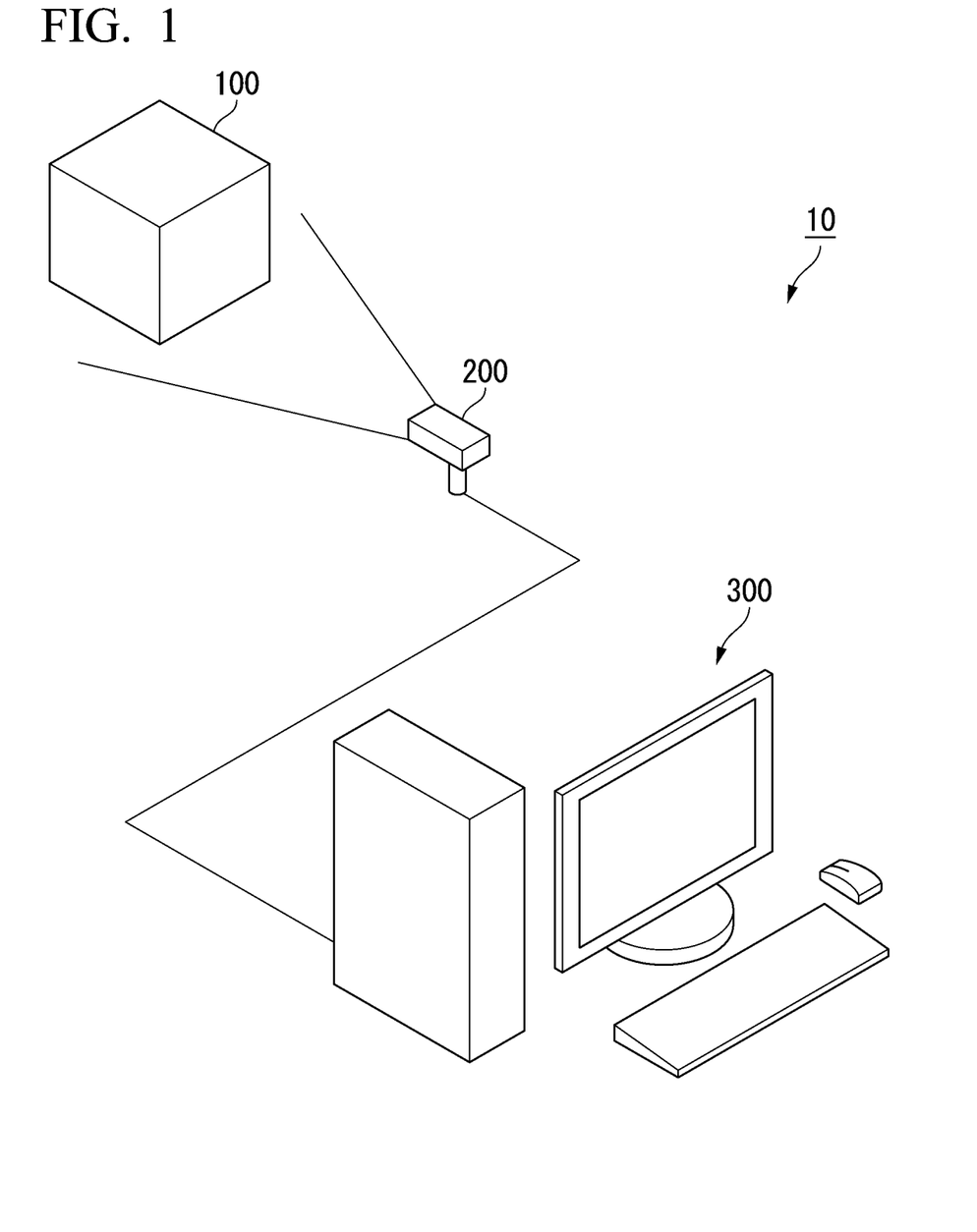
FIG. 1 is a schematic diagram showing a configuration of a monitoring system according to a first embodiment.

FIG. 1 is a schematic diagram showing a configuration of a monitoring system according to a first embodiment.

A monitoring system 10 according to the first embodiment determines the normality of a monitoring target 100 from image data on the basis of the nearest neighbor method. The nearest neighbor method is a method of extracting normal sample data of target data from a plurality of sample data and determining normality on the basis of the extracted sample data. Examples of the nearest neighbor method include the k nearest neighbor method and the local outlier method.

The monitoring system 10 includes an imaging device 200 and a monitoring device 300.

The imaging device 200 captures an image of the monitoring target 100 and obtains visible image data, infrared image data, and thermal image data. The visible image data is image data obtained by measuring visible light reflected by the monitoring target 100. The infrared image data is image data obtained by measuring infrared rays that are projected by the imaging device 200 and reflected by the monitoring target 100. The thermal image data is image data obtained by measuring infrared rays emitted from the monitoring target 100. The imaging device 200 captures image data at regular intervals.

The monitoring device 300 determines the normality of the monitoring target 100 on the basis of the image data captured by the imaging device 200.

Figure 2:
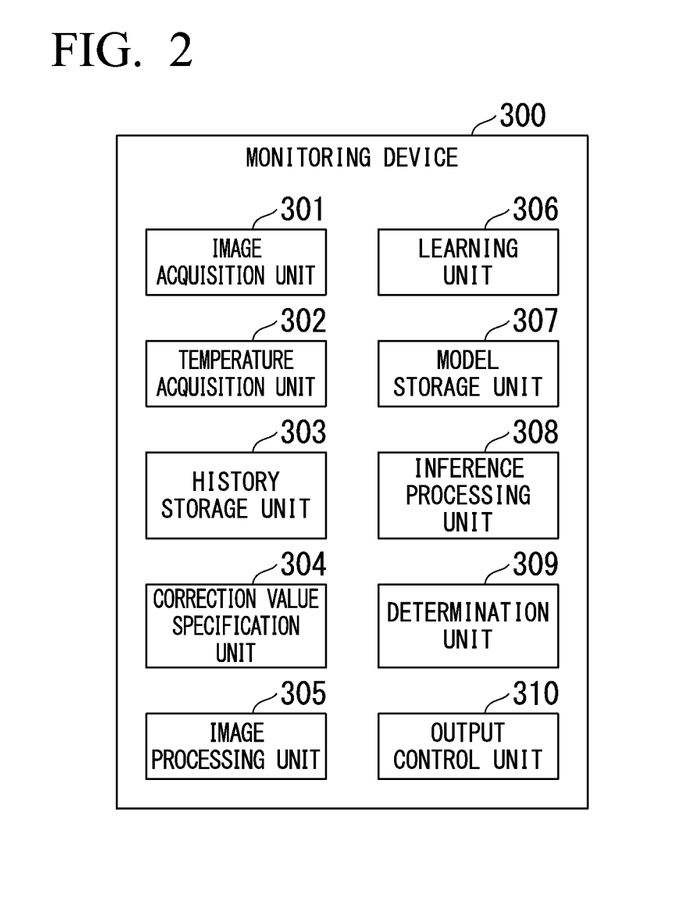
FIG. 2 is a schematic block diagram showing a configuration of a monitoring device according to the first embodiment.

FIG. 2 is a schematic block diagram showing the configuration of the monitoring device according to the first embodiment.

The monitoring device 300 includes an image acquisition unit 301, a temperature acquisition unit 302, a history storage unit 303, a correction value specification unit 304, an image processing unit 305, a learning unit 306, a model storage unit 307, an inference processing unit 308, a determination unit 309, and an output control unit 310.

The image acquisition unit 301 acquires visible image data, infrared image data, and thermal image data captured by the imaging device 200.

The history storage unit 303 stores image data and imaging time in association with each other. All the image data stored in the history storage unit 303 is image data in which an image of the normal monitoring target 100 is captured.

The temperature acquisition unit 302 acquires temperature data indicating the environmental temperature of the monitoring target 100 when the imaging device 200 captures image data. For example, the temperature acquisition unit 302 acquires weather information of an area where the monitoring target 100 is installed through a network.

The correction value specification unit 304 specifies a correction value used for image processing of image data. Specifically, the correction value specification unit 304 specifies a gamma correction value for changing the color tone of the visible image data in accordance with the environmental illuminance of the monitoring target 100 on the basis of the visible image data stored in the history storage unit 303. That is, the correction value specification unit 304 specifies a relationship between the increase in average luminance of the visible image data and the gamma correction value on the basis of the visible image data stored in the history storage unit 303. The visible image data has a lower luminance and a lower contrast as the environmental illuminance is lower. The correction value specification unit 304 specifies a gamma correction value for changing the color tone of the thermal image data in accordance with the environmental temperature on the basis of the thermal image data stored in the history storage unit 303. That is, the correction value specification unit 304 specifies a relationship between the temperature increment and the gamma correction value on the basis of the thermal image data stored in the history storage unit 303. The thermal image data has a lower luminance as the temperature is lower.

The image processing unit 305 generates a plurality of duplicate image data pieces by performing a plurality of different image processing procedures on the image data. Examples of the image processing include smoothing processing, gamma correction, edge extraction, translation, rotation, and the like. The gamma correction is an example of image processing that involves a change in color tone. For example, for A pieces of image data, the image processing unit 305 performs smoothing processing of B patterns, gamma correction of C patterns, translation of D patterns, and rotation of E patterns so as to generate A×B×C×D×E pieces of duplicate image data. The image processing unit 305 performs different image processing that involves the change in color tone within a range not exceeding the normal range of the monitoring target 100. For example, in a case of performing image processing of a thermal image, the image processing unit 305 performs image processing so as to change the color tone of image data within a temperature range of a maximum temperature to a minimum temperature during a predetermined period. For example, in a case of performing image processing of a visible image, the image processing unit 305 performs image processing so as to change the color tone of the image data within an illuminance range of lighting on to off.

The learning unit 306 trains a model using the image data stored in the history storage unit 303 and the duplicate image data generated by the image processing unit 305 as training data. That is, the learning unit 306 causes the model storage unit 307 to store the image data, which is input to the image acquisition unit 301, and the duplicate image data, which is generated by the image processing unit 305, as sample data for the nearest neighbor method. A sample data group including a plurality of duplicate image data pieces is an example of a learned model.

The model storage unit 307 stores the model trained by the learning unit 306.

The inference processing unit 308 calculates an index value indicating the normality of the monitoring target 100 from the image data, which is input to the image acquisition unit 301, using the model stored in the model storage unit 307. The index value increases as the possibility that the monitoring target 100 is abnormal increases.

The determination unit 309 determines the normality of the monitoring target 100 by comparing the index value calculated by the inference processing unit 308 with a threshold value. The determination unit 309 determines that the monitoring target 100 is normal in a case where the index value is less than the threshold value. The determination unit 309 determines that the monitoring target 100 is abnormal in a case where the index value is equal to or greater than the threshold value.

The output control unit 310 causes the output device to output the determination result obtained by the determination unit 309. Examples of the output device include a display, a printer, and a speaker.

Next, the operation of the monitoring device according to the first embodiment will be described. The image acquisition unit 301 of the monitoring device 300 acquires image data from the imaging device 200 and records the image data in the history storage unit 303 in association with the imaging time before creating a learned model. Thereby, the monitoring device 300 stores a plurality of image data pieces in the history storage unit 303. At this time, the monitoring device 300 may exclude image data by which the image of the monitoring target 100 cannot be reproduced due to blocked up shadows or blown out highlights.

Figure 3:
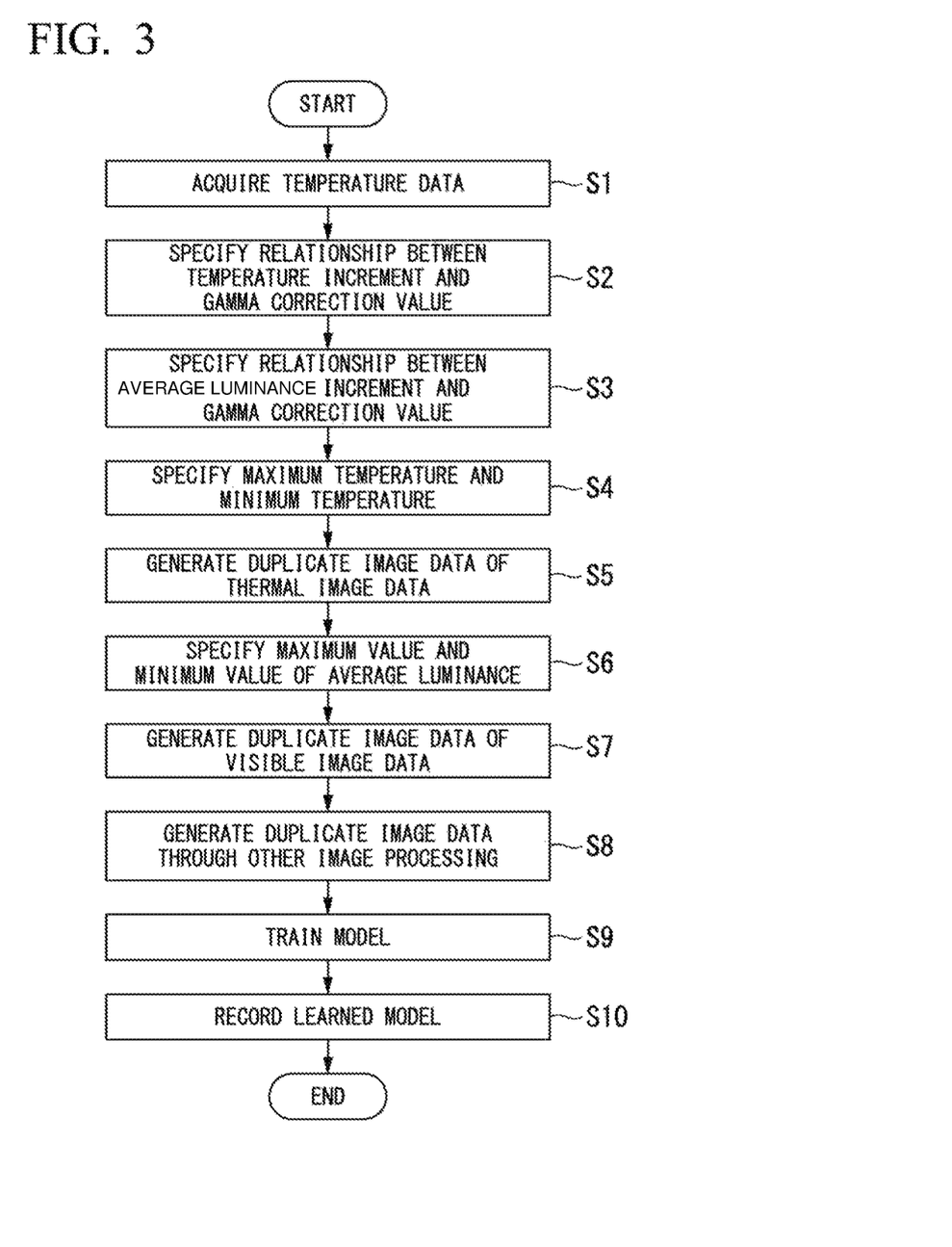
FIG. 3 is a flowchart showing a method for learned model generation using the monitoring device according to the first embodiment.

FIG. 3 is a flowchart showing a method for learned model generation using the monitoring device according to the first embodiment.

The temperature acquisition unit 302 of the monitoring device 300 acquires temperature data indicating the environmental temperature of the monitoring target 100 at the imaging time of the image data stored in the history storage unit 303 (step S1). The correction value specification unit 304 specifies the relationship between the temperature increment and the gamma correction value on the basis of the color tone of the plurality of thermal image data stored in the history storage unit 303 and the environmental temperature at the time of capturing the thermal image data (step S2). For example, the correction value specification unit 304 obtains a gamma correction value at which the difference in luminance is minimized for two pieces of thermal image data, and further obtains an environmental temperature difference between the two pieces of thermal image data. Thereby, it is possible to obtain the relationship between the gamma correction value and the temperature increment. The correction value specification unit 304 specifies the relationship between the average luminance increment and the gamma correction value on the basis of the color tone of the plurality of visible image data stored in the history storage unit 303 (step S3).

On the basis of the temperature data acquired by the temperature acquisition unit 302 or other weather data, the image processing unit 305 specifies the maximum temperature and the minimum temperature in a predetermined period (for example, two months) starting from the current time (step S4). The image processing unit 305 performs gamma correction on each thermal image data, which is stored in the history storage unit 303, respectively using the gamma correction values corresponding to the increments, which range from the environmental temperature relating to the thermal image data to each temperature obtained by dividing the range from the minimum temperature to the maximum temperature into a predetermined number, thereby generating a plurality of duplicate image data pieces (step S3). For example, when the maximum temperature is 10° C., the minimum temperature is −10° C., and the environmental temperature relating to certain thermal image data is 0° C., and when the range from the minimum temperature to the maximum temperature are divided into five. In this case, the image processing unit 305 performs gamma correction of thermal image data by using a gamma correction value corresponding to an increment of −10° C., a gamma correction value corresponding to an increment of −5° C., a gamma correction value corresponding to an increment of 5° C., and a gamma correction value corresponding to an increment of 10° C., thereby generating four duplicate image data pieces.

The image processing unit 305 specifies the maximum value and the minimum value of the average luminance on the basis of the visible image data stored in the history storage unit 303 (step S6). The image processing unit 305 performs gamma correction on each visible image data stored in the history storage unit 303, by respectively using gamma correction values corresponding to increments, which ranges from the average luminance of the visible image data to each luminance obtained by dividing the average luminance range into a predetermined number, thereby generating a plurality of duplicate image data pieces (step S7).

The image processing unit 305 further generates a plurality of duplicate image data pieces by performing other image processing including at least a smoothing process on each image data stored in the history storage unit 303 and each duplicate image data (step S8).

The learning unit 300 trains a model using the image data stored in the history storage unit 303 and a plurality of duplicate image data pieces generated by the image processing unit 305 as training data (step S9), and records the learned model in the model storage unit 307 (step S10).

Figure 4:
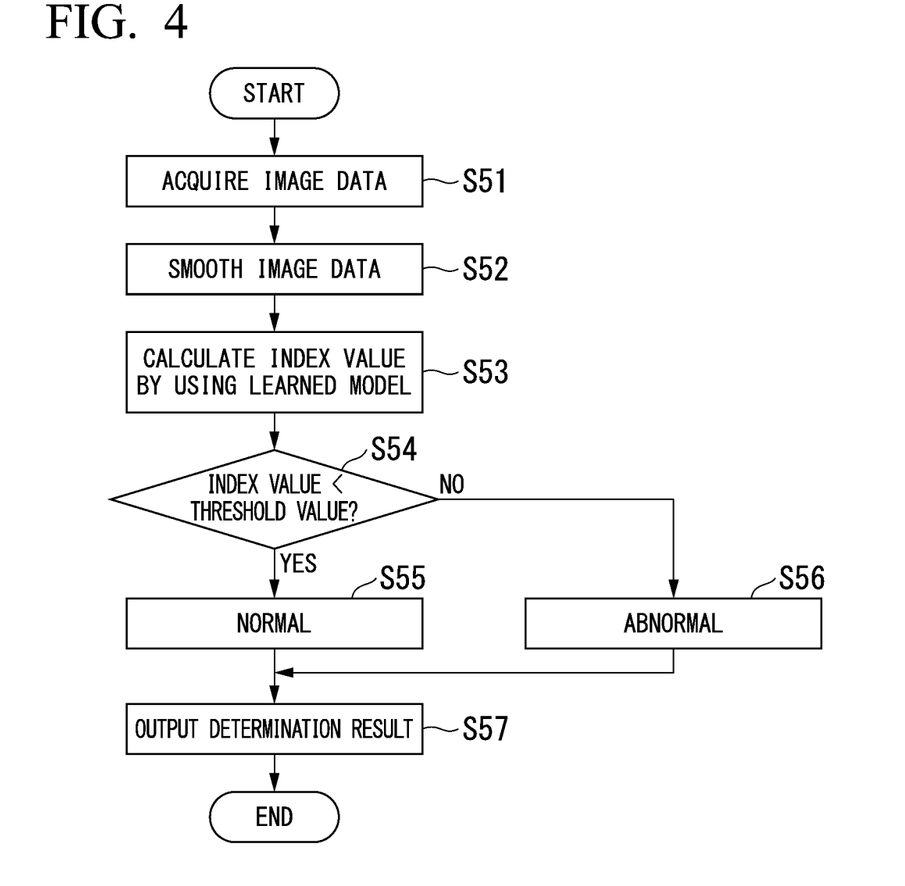
FIG. 4 is a flowchart showing a normality determination method using the monitoring device according to the first embodiment.

In a case where the learned model is stored in the model storage unit 307, the monitoring device 300 performs normality determination processing of the monitoring target 100 at each timing relating to a certain period. FIG. 4 is a flowchart showing a normality determination method using the monitoring device according to the first embodiment.

The image acquisition unit 301 of the monitoring device 300 acquires image data from the imaging device 200 (step S51). Next, the image processing unit 305 smoothes the acquired image data (step S52). The inference processing unit 308 calculates the index value by inputting the smoothed image data to the learned model stored in the model storage unit 307 (step S53).

For example, the inference processing unit 308 performs the following processing in a case of calculating the index value by the k-nearest neighbor method. The inference processing unit 308 calculates the distance between the acquired image data and each sample data constituting the learned model. The inference processing unit 308 specifies, as an index value, a representative value of distances relating to the k pieces of sample data having the shortest calculated distance.

For example, the inference processing unit 308 performs the following processing in a case of calculating the index value through the local outlier factor method. The inference processing unit 308 calculates the distance between the acquired image data and each sample data constituting the learned model. The inference processing unit 308 calculates the densities of k pieces of the sample data having the shortest calculated distance. The inference processing unit 308 specifies, as an index value, a value that is normalized on the basis of the density obtained by calculating a representative value of distances relating to k pieces of the sample data.

The distance between the sample data and the acquired image data, the density of the sample data, and the index value are examples of "a value used for determining the normality of the monitoring target".

Next, the determination unit 309 determines whether or not the index value is less than a threshold value (step S54). If the index value is less than the threshold value (step S54: YES), the determination unit 309 determines that the monitoring target 100 is normal (step S55). In contrast, if the index value is greater than or equal to the threshold value (step S54: NO), the determination unit 309 determines that the monitoring target 100 is abnormal (step S56).

Then, the output control unit 310 causes the output device to output the determination result of the determination unit 309 (step S57).

As described above, the monitoring device 300 according to the first embodiment performs different image processing causing a change in color tone on the image data obtained by capturing the normal monitoring target within a range not exceeding the normal range of the monitoring target. Thereby, a plurality of duplicate image data pieces is generated, and the model is trained using these data pieces as training data. Thereby, the monitoring device 300 is able to generate a large amount of training data from a small amount of image data. Therefore, in the monitoring system 10 according to the first embodiment, the normality of the monitoring target can be appropriately determined by the learned model even in a state where the original training data is small. In the first embodiment, the gamma correction using different gamma correction values is used as the different image processing causing the change in color tone. However, the present invention is not limited to this. For example, in other embodiments, different image processing such as contrast correction and luminance correction using different correction values may be performed.

The image processing unit 305 according to the first embodiment generates a plurality of duplicate image data pieces by performing image processing of correcting the color tone of the thermal image data to a color tone corresponding to a different temperature within the environmental temperature change range of the monitoring target 100. Thereby, the image processing unit 305 is able to generate thermal image data indicating the state of the monitoring target 100 at an environmental temperature that is not actually observed. The correction value specification unit 304 specifies the relationship between the temperature change and the color tone correction value on the basis of the image data and the environmental temperature at the time of imaging. As a result, the monitoring device 300 is able to perform image processing so as to obtain the color tone corresponding to the target temperature.

The image processing unit 305 according to the first embodiment generates a plurality of duplicate image data pieces by performing image processing of correcting the color tone of the visible image data to a color tone corresponding to a different illuminance within the environmental illuminance change range of the monitoring target 100. Thereby, the image processing unit 305 is able to generate visible image data indicating the state of the monitoring target 100 in an illumination environment that is not actually observed.

Further, the monitoring device 300 according to the first embodiment learns the normal state of the monitoring target 100 as a learned model. That is, in the monitoring device 300 according to the first embodiment, only image data captured by the normal monitoring device 300 in the normal state is used as training data, and image data captured by the abnormal monitoring device 300 is not used. Therefore, it is not necessary for the monitoring device 300 to attach a label indicating whether the image data is normal or abnormal in a case of using each image data as training data.

By the way, by continuing monitoring of the monitoring target 100, the number of image data pieces captured by the imaging device 200 gradually increases. Therefore, in a case where the learning unit 306 appropriately updates the model stored in the model storage unit 307, the number of original image data (non-duplicate image data) constituting the learned model increases. The original image data is more reliable as training data than the duplicate image data. Therefore, in a case of selecting sample data in the vicinity of input image data, the monitoring device 300 may form a model such that the original image data can be selected more easily than the duplicate image data. For example, in a case where the original image data is newly acquired in a state where the number of sample data reaches a predetermined number, the learning unit 306 may update the learned model by adding the original image data to the sample data and deleting sample data that is duplicate image data. Further, for example, the inference processing unit 308 may easily select the original image data by multiplying the distance of the original image data by a weight less than 1 in a case of selecting the sample data. However, in a case where the inference processing unit 308 calculates the index value using the selected sample data, the inference processing unit 308 calculates the index value on the basis of the distance not multiplied by the weight.

Second Embodiment

The monitoring system 10 according to the first embodiment determines the normality of the monitoring target 100 from the image data on the basis of the nearest neighbor method. In contrast, the monitoring system 10 according to a second embodiment determines the normality of the monitoring target 100 from the image data on the basis of the neural network.

The monitoring device 300 according to the second embodiment differs from the first embodiment in terms of the model stored in the model storage unit 307 and the processing of the learning unit 306, the inference processing unit 308, and the determination unit 309.

The model storage unit 307 stores a neural network model including an input layer, an intermediate layer, and an output layer. The number of nodes in the input layer and the output layer is equal to the number of pixels in the image data. The learned model functions as an auto encoder that compresses image data, which is input to the input layer, and thereafter restores and outputs the image data. The image data, which is output by the learned model, is an example of "a value used for determining the normality of the monitoring target".

The learning unit 306 trains a model using the image data stored in the history storage unit 303 and the duplicate image data generated by the image processing unit 305 as training data. That is, the learning unit 306 inputs training data to the input layer and the output layer of the model stored in the model storage unit 307 and trains the weighting coefficient and the activation function at each node of the input layer and the intermediate layer. Each of the training data is image data in which the monitoring target 100 in the normal state is captured. For this reason, the learned model is trained from the input image data so as to output image data in which the monitoring target 100 in the normal state is captured. In other words, in a case where the image data in which the monitoring target 100 in an abnormal state is captured is input to the learned model, it is expected that the learned model outputs image data in which the monitoring target 100 closer to the normal state than that of the original image data is captured.

The inference processing unit 308 regenerates image data from the image data, which is input to the image acquisition unit 301, using the learned model stored in the storage unit 307. Since the learned model is trained on the basis of the image data in which the monitoring target 100 in the normal state is captured, as the possibility that the monitoring target 100 is abnormal increases, the difference between the input image data and the regenerated image data increases.

The determination unit 309 determines the normality of the monitoring target 100 by calculating a difference between the input image data and the image data regenerated by the inference processing unit 308 and comparing the difference with a threshold value. The determination unit 309 determines that the monitoring target 100 is normal in a case where the difference between the regenerated image data and the input image data is less than the threshold value. The determination unit 309 determines that the monitoring target 100 is abnormal in a case where the index value is equal to or greater than the threshold value.

As described above, in a manner similar to the monitoring device 300 according to the first embodiment, the monitoring device 300 according to the second embodiment is able to appropriately determine the normality of the monitoring target using the learned model even in a state where the volume of the original training data is small.

The learned model according to the second embodiment outputs a regenerated image but it is not limited thereto. For example, in another embodiment, the difference between the input image data and the image data regenerated by the learned model may be output. In such a case, the difference between the regenerated image data and the input image data is an example of "a value used for determining the normality of the monitoring target".

By the way, the monitoring target 100 is continuously monitored, and the learning unit 306 appropriately updates the model stored in the model storage unit 307, whereby a range of the maximum value to the minimum value of the environmental temperature relating to the image data used for learning of the learned model becomes wider. For example, in a case where learning is continued for half a year, the learned model is trained from image data in which the monitoring target 100 in summer is captured and is also trained from image data in which the monitoring target 100 in winter is captured. In such a case, for example, in a case where thermal image data in which the monitoring target 100 is in an overheated state is used as an input and the image data is regenerated in a learned model, there is a possibility that the difference between the input image data and the regenerated image data is equal to or less than a threshold value. The reason for this is that the learned model is regenerated as image data relating to the temperature in the normal state in summer as a result of learning using the image data in summer. Therefore, the monitoring device 300 may update the learning model such that the learning is constantly performed using the image data relating to the predetermined period. For example, the learning unit 306 may periodically train a model by using image data of images captured in the latest predetermined period in the image data stored in the history storage unit 303, overwrite the old model, and record the model in the model storage unit 307.

Third Embodiment

The monitoring system 10 according to the third embodiment outputs a portion of the monitoring target 100 where abnormality occurs.

Figure 5:
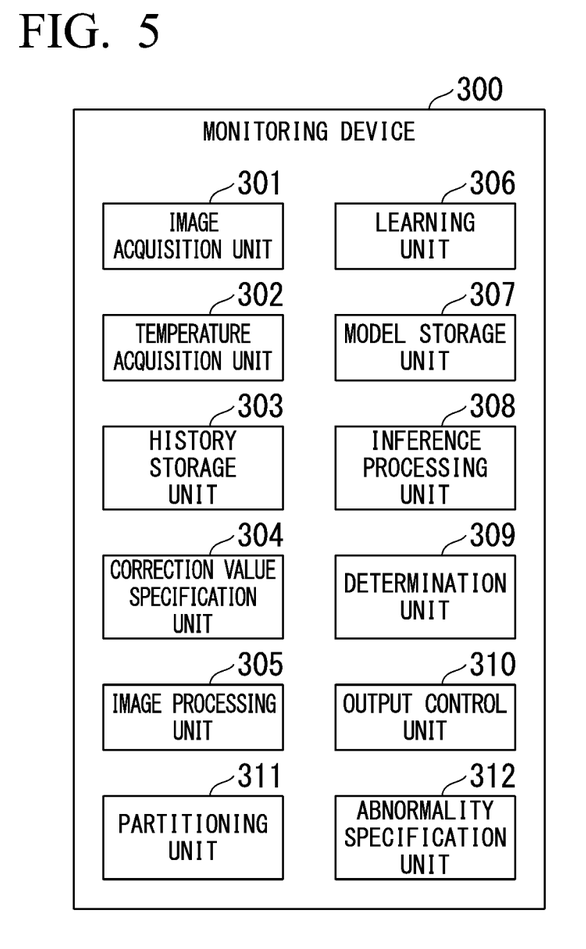
FIG. 5 is a schematic block diagram showing a configuration of a monitoring device according to a third embodiment.

FIG. 5 is a schematic block diagram showing a configuration of a monitoring device according to a third embodiment.

The monitoring device 300 according to the third embodiment further includes a partitioning unit 311 and an abnormality specification unit 312 in addition to the configurations of the first and second embodiments.

Figure 6:
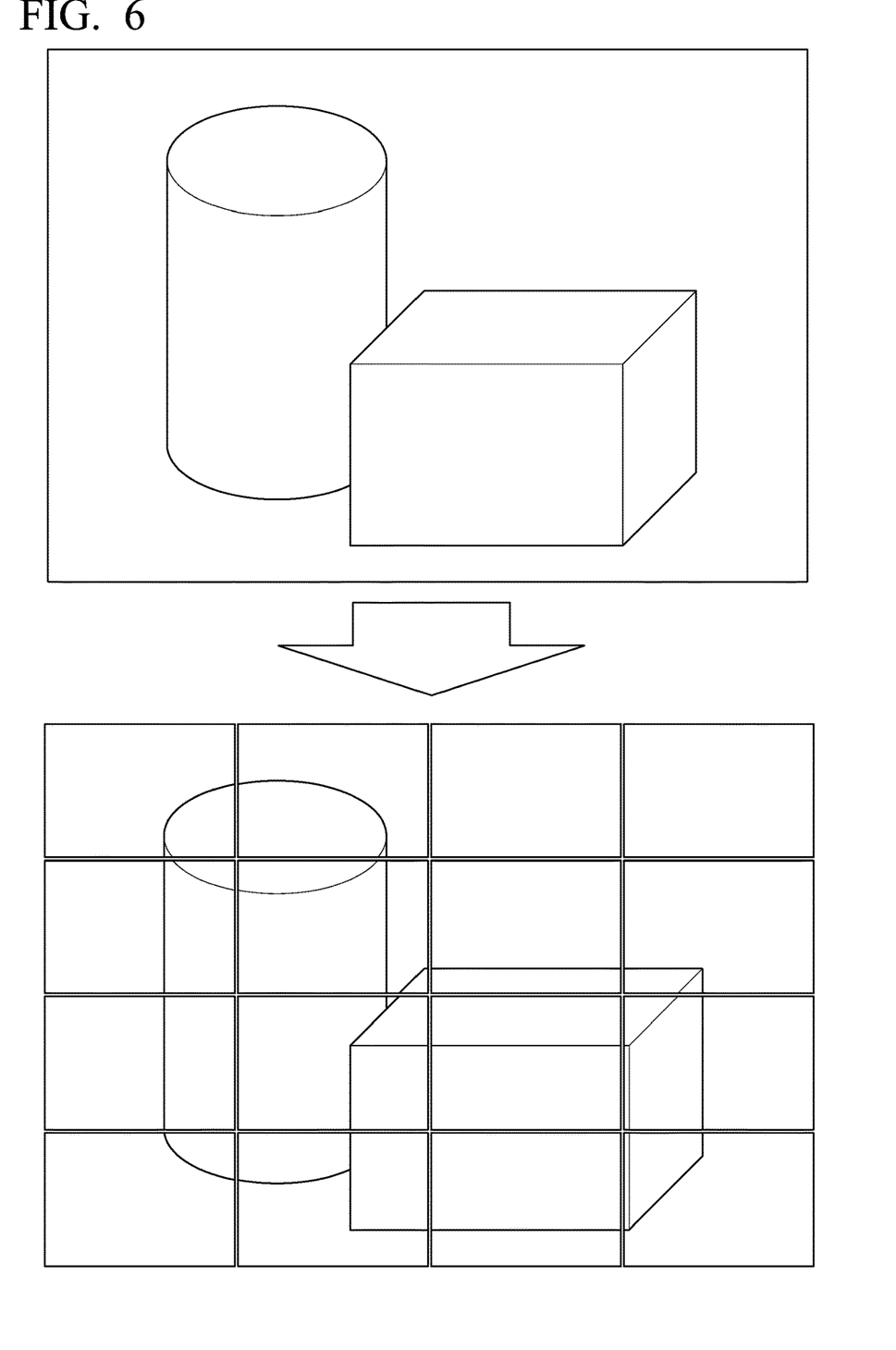
FIG. 6 is a diagram showing an example of partitioning of image data according to the third embodiment.

FIG. 6 is a diagram showing an example of partitioning of image data according to the third embodiment.

The partitioning unit 311 partitions the image data acquired by the image acquisition unit 301 into a plurality of regions, and generates partitioned image data. For example, the partitioning unit 311 generates sixteen partitioned image data pieces obtained by partitioning the image data into four equal parts vertically by four equal parts horizontally. The image processing unit 305 performs image processing on each partitioned image data so as to generate the duplicate image data.

The learning unit 306 trains a model for each of a plurality of regions partitioned by the partitioning unit 311 using the partitioned image data and the duplicate image data as training data. The model storage unit 307 stores a learned model for each partitioned region.

The inference processing unit 308 calculates the index value of each region by inputting the partitioned image data partitioned by the partitioning unit 311 to each corresponding learned model. The determination unit 300 determines that the monitoring target 100 is abnormal in a case where the index value is equal to or greater than the threshold value for at least one region, by comparing the index value of each region with a threshold value. The abnormality specification unit 312 specifies a portion where abnormality occurs in the monitoring target 100 by specifying a region where the index value is equal to or greater than the threshold value. The output control unit 310 causes the output device to output information indicating the portion specified by the abnormality specification unit 312.

As described above, according to the third embodiment, the monitoring device 300 partitions image data to generate a plurality of partitioned image data pieces and performs different image processing causing a change in color tone on each of the partitioned image data, thereby generating a plurality of duplicate image data pieces. Thereby, the monitoring device 300 is able to specify the portion where abnormality occurs on the basis of image data.

Modification Example

As described above, the embodiment has been described in detail with reference to the drawings. However, the specific configuration is not limited to that described above, and various design changes and the like can be made.

For example, in the above-mentioned embodiment, the monitoring device 300 performs model learning and inference on the basis of the model, but the present invention is not limited thereto. For example, in another embodiment, the model learning device and the monitoring device 300 may be provided separately, the model learning device may performs the model learning, and the monitoring device 300 may perform inference based on the model.

Figure 7:
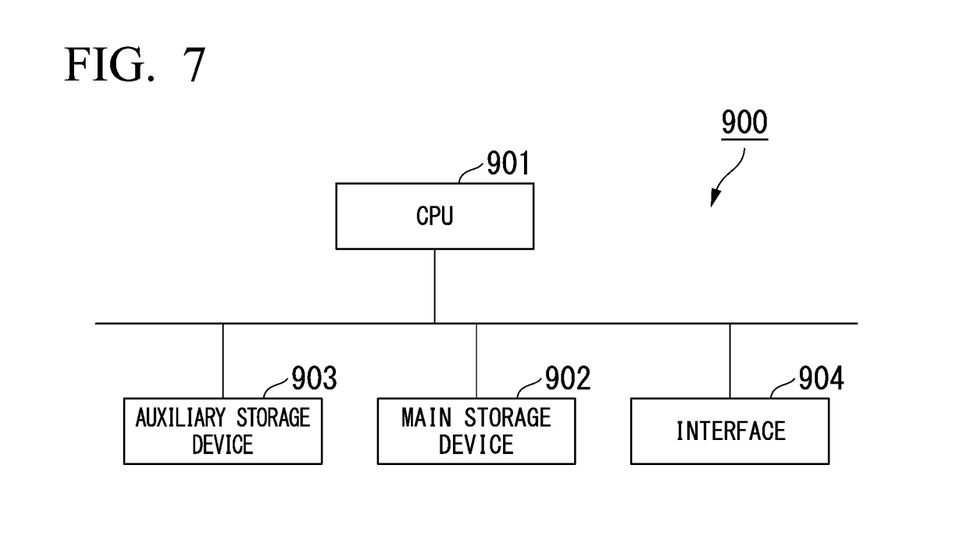
FIG. 7 is a schematic block diagram showing a configuration of a computer according to at least one embodiment.

FIG. 7 is a schematic block diagram showing a configuration of a computer according to at least one of the embodiments.

The computer 900 includes a CPU 901, a main storage device 902, an auxiliary storage device 903, and an interface 904.

The monitoring device 300 described above is mounted on the computer 900. The operation of each processing unit described above is stored in the auxiliary storage device 903 in the format of a program. The CPU 901 reads a program from the auxiliary storage device 903, loads the program in the main storage device 902, and executes the above processing in accordance with the program. In addition, the CPU 901 ensures a storage area corresponding to each storage unit described above in the main storage device 902 or the auxiliary storage device 903 in accordance with the program.

Examples of the auxiliary storage device 903 include a hard disk drive (HDD), a solid state drive (SSD), a magnetic disk, a magneto-optical disk, a compact disc read only memory (CD-ROM), a digital versatile disc read only memory (DVD-ROM), semiconductor memory, and the like. The auxiliary storage device 903 may be an internal medium directly connected to the bus of the computer 900 or an external medium connected to the computer 900 through the interface 904 or a communication line. In a case where this program is transferred to the computer 900 through a communication line, the computer 900 that receives the program may develop the program in the main storage device 902 and execute the above processing. In at least one of the embodiments, the auxiliary storage device 903 is a non-transitory type storage medium.

Further, the program may be for realizing a part of the functions described above. Further, the program may be a so-called difference file (difference program) that realizes the above-mentioned function in combination with another program stored in advance in the auxiliary storage device 903.

INDUSTRIAL APPLICABILITY

The model learning device according to the present invention is able to appropriately determine the normality of the monitoring target on the basis of the learned model even in a state where the volume of the training data is small.

REFERENCE SIGNS LIST

10: monitoring system
100: monitoring target
200: imaging device
300: monitoring device
301: image acquisition unit
302: temperature acquisition unit
303: history storage unit
304: correction value specification unit
305: image processing unit
306: learning unit
307: model storage unit
308: inference processing unit
309: determination unit
310: output control unit
311: partitioning unit
312: abnormality specification unit

The invention claimed is:

1. A model learning device comprising:
an image acquisition unit that acquires image data in which an image of a normal monitoring target is captured, the image data including at least one of visible image data, infrared image data, and thermal image data;
a state amount acquisition unit that is configured to acquire an environmental state amount when the imaging device captures image data, the environmental state amount being one of temperature data indicating the environmental temperature of the monitoring target and environmental illuminance of the monitoring target;

a partitioning unit that generates a plurality of partitioned image data pieces by partitioning the image data;
an image processing unit that generates a plurality of duplicate image data pieces by performing different image processing on the image data for each of a plurality of environmental state amounts within a predetermined range not exceeding a change range of a normal environment state amount of the monitoring target, the different image processing causing a change in color tone on the image data based on a changing amount from the environmental state amount obtained when capturing the image data; and
a learning unit that trains a model so as to output a value used for determining normality of the monitoring target from the image data, in which the image of the monitoring target is captured, using the plurality of duplicate image data pieces as training data,
wherein the image processing unit generates the plurality of duplicate image data pieces by performing different image processing causing a change in color tone on each of the plurality of partitioned image data pieces, and
wherein the learning unit updates the model so as to overwrite an old model by performing learning using the image data relating to a latest predetermined period.

2. The model learning device according to claim 1,
wherein the image data includes a thermal image having a different color tone depending on a temperature of the monitoring target, and
wherein the image processing unit generates the plurality of duplicate image data pieces by performing image processing for correcting the color tone of the image data to a color tone corresponding to a different temperature within a change range of an environmental temperature of the monitoring target.

3. The model learning device according to claim 2, further comprising:
a temperature acquisition unit that acquires temperature data indicating the environmental temperature of the monitoring target of when the image data is captured; and
a correction value specification unit that specifies a relationship between a temperature change and a color tone correction value on the basis of the image data and the temperature data,
wherein the image processing unit performs image processing on the image data using the correction value specified on the basis of the relationship specified by the correction value specification unit.

4. The model learning device according to claim 1,
wherein the image processing unit generates the plurality of duplicate image data pieces by performing image processing for correcting the color tone of the image data to a color tone corresponding to a different illuminance within a change range of an environmental illuminance of the monitoring target.

5. The model learning device according to claim 1,
wherein the learning unit periodically trains the model to update the model so as to overwrite an old model by performing learning using the image data relating to a latest season.

6. The model learning device according to claim 1,
wherein the learning unit trains the model, when in summer, from image data in which the monitoring target in summer is captured, and the leaning unit trains the model, when in winter, from image data in which the monitoring target in winter is captured.

7. A method for learned model generation comprising the steps of:
acquiring image data in which an image of a normal monitoring target is captured, the image data including at least one of visible image data, infrared image data, and thermal image data;
acquiring an environmental state amount when the imaging device captures image data, the environmental state amount being one of temperature data indicating the environmental temperature of the monitoring target and environmental illuminance of the monitoring target;
generating a plurality of partitioned image data pieces by partitioning the image data;
generating a plurality of duplicate image data pieces by performing different image processing on the image data for each of a plurality of environmental state amounts within a predetermined range not exceeding a change range of a normal environment state amount of the monitoring target, the different image processing causing a change in color tone on the image data based on a changing amount from the environmental state amount obtained when capturing the image data; and
generating a learned model by training a model so as to output a value used for determining normality of the monitoring target from the image data, in which the image of the monitoring target is captured, using the plurality of duplicate image data pieces as training data,
wherein, in the step of generating the plurality of duplicate image data pieces, the plurality of duplicate image data pieces are generated by performing different image processing causing a change in color tone on each of the plurality of partitioned image data pieces, and
wherein the learned model is updated so as to overwrite an old learned model by performing learning using the image data relating to a latest predetermined period.

8. A non-transitory computer-readable computer medium storing a program for causing a computer to execute the steps of:
acquiring image data in which an image of a normal monitoring target is captured, the image data including at least one of visible image data, infrared image data, and thermal image data;
acquiring an environmental state amount when the imaging device captures image data, the environmental state amount being one of temperature data indicating the environmental temperature of the monitoring target and environmental illuminance of the monitoring target;
generating a plurality of partitioned image data pieces by partitioning the image data;
generating a plurality of duplicate image data pieces by performing different image processing on the image data for each of a plurality of environmental state amounts within a predetermined range not exceeding a change range of a normal environment state amount of the monitoring target, the different image processing causing a change in color tone on the image data based on a changing amount from the environmental state amount obtained when capturing the image data; and
training a model so as to output a value used for determining normality of the monitoring target from the image data, in which the image of the monitoring target is captured, using the plurality of duplicate image data pieces as training data,
wherein, in the step of generating the plurality of duplicate image data pieces, the plurality of duplicate image data pieces are generated by performing different image processing causing a change in color tone on each of the plurality of partitioned image data pieces, and wherein in the step of training the model, the model is updated so as to overwrite an old model by performing learning using the image data relating to a latest predetermined period.

9. A non-transitory computer-readable computer medium storing a learned model which is trained so as to output a value used for determining normality of a monitoring target from image data, in which an image of the monitoring target is captured, the image data including at least one of visible image data, infrared image data, and thermal image data, using a plurality of duplicate image data pieces generated by performing different image processing on the image data for each of a plurality of environmental state amounts, an environmental state amount being one of temperature data indicating the environmental temperature of the monitoring target and environmental illuminance of the monitoring target when the imaging device captures image data, within a predetermined range not exceeding a change range of a normal environment state amount of the monitoring target, as training data, wherein the different image processing causes a change in color tone on the image data based on a changing amount from the environmental state amount obtained when capturing the image data, wherein the image data is partitioned to generate a plurality of partitioned image data pieces, wherein the plurality of duplicate image data pieces are generated by performing different image processing causing a change in color tone on each of the plurality of partitioned image data pieces, and wherein the learned model is updated so as to overwrite an old learned model by performing learning using the image data relating to a latest predetermined period, the learned model for causing a computer to execute the step of:

outputting a value used for determining normality of the monitoring target from the acquired image data.

10. A monitoring device comprising:

an image acquisition unit that acquires captured image data, the image data including at least one of visible image data, infrared image data, and thermal image data;

an inference processing unit that calculates a value used in determining normality of a monitoring target from the image data using the learned model according to claim 9; and a determination unit that determines normality of the monitoring target by using the calculated value.

11. A monitoring method comprising the steps of:

acquiring a first image data in which an image of a normal monitoring target is captured;

acquiring an environmental state amount when the imaging device captures the first image data, the environmental state amount being one of temperature data indicating the environmental temperature of the monitoring target and environmental illuminance of the monitoring target;

generating a plurality of duplicate image data pieces by performing different image processing on the first image data for each of a plurality of environmental state amounts within a predetermined range not exceeding a change range of a normal environment state amount of the monitoring target, the different image processing causing a change in color tone on the first image data based on a changing amount from the environmental state amount obtained when capturing the first image data; and generating a learned model by training a model so as to output a value used for determining normality of the monitoring target from image data, in which the image of the monitoring target is captured, using the plurality of duplicate image data pieces as training data, acquiring a second image data in which an image of the monitoring target is captured;

calculating a value used in determining normality of the monitoring target from the second image data using the learned model; and determining normality of the monitoring target by using the calculated value.

* * * * *